US006931648B2

United States Patent
Kiang et al.

(10) Patent No.: US 6,931,648 B2
(45) Date of Patent: Aug. 16, 2005

(54) METHOD AND APPARATUS FOR PREVENTING DAMAGE DUE TO MEDIA FAULTS IN DISCS SPINNING AT HIGH SPEEDS

(75) Inventors: Chng Huang Kiang, Singapore (SG); Chiang Kwong Pui, Singapore (SG)

(73) Assignee: Creative Technology Ltd., Singapore (SG)

( * ) Notice: Subject to any disclaimer, the term of this patent is extended or adjusted under 35 U.S.C. 154(b) by 418 days.

(21) Appl. No.: 09/887,878

(22) Filed: Jun. 21, 2001

(65) Prior Publication Data

US 2001/0055261 A1 Dec. 27, 2001

Related U.S. Application Data

(60) Provisional application No. 60/213,735, filed on Jun. 22, 2000.

(51) Int. Cl.[7] ................................................ G11B 33/02
(52) U.S. Cl. ....................................................... 720/601
(58) Field of Search ..................... 720/601; 369/75.11, 369/75.21, 77.11, 77.21, 75.1, 75.2, 77.1, 77.2

(56) References Cited

U.S. PATENT DOCUMENTS

| 4,583,213 | A  | * | 4/1986  | Bracken et al. | ............. 369/261  |
| 4,660,110 | A  | * | 4/1987  | Iida et al.    | ................ 360/97.03 |
| 5,067,121 | A  | * | 11/1991 | Einhaus        | ...................... 720/612 |
| 5,701,216 | A  | * | 12/1997 | Yamamoto et al.| ...... 360/99.02 |
| 5,793,729 | A  | * | 8/1998  | Soga et al.    | .................. 720/603 |
| 5,940,245 | A  | * | 8/1999  | Sasaki et al.  | ............. 360/99.06 |
| 6,175,544 | B1 | * | 1/2001  | Shiomi         | ....................... 369/219 |
| 6,229,304 | B1 | * | 5/2001  | Guzik          | ........................ 324/212 |
| 6,320,836 | B1 | * | 11/2001 | Hattori et al. | ............. 369/77.2 |
| 6,421,311 | B1 | * | 7/2002  | Nakazato et al.| ........... 720/604 |
| 6,487,038 | B1 | * | 11/2002 | Izumi et al.   | ............. 360/97.02 |
| 6,512,729 | B2 | * | 1/2003  | Shih           | .......................... 369/75.2 |
| 6,529,461 | B1 | * | 3/2003  | Watanabe et al.| .......... 369/75.2 |

* cited by examiner

Primary Examiner—Angel A Castro
(74) Attorney, Agent, or Firm—Schwegman, Lundberg, Woessner & Kluth, P.A.

(57) ABSTRACT

A system that prevents fragments of a disc from escaping from a drive. According to one embodiment of the present invention, the system comprises a drive and a fragment barricade affixed within the drive. The fragment barricade is positioned within the drive so as to prevent fragments of the disc from escaping from the drive.

13 Claims, 7 Drawing Sheets

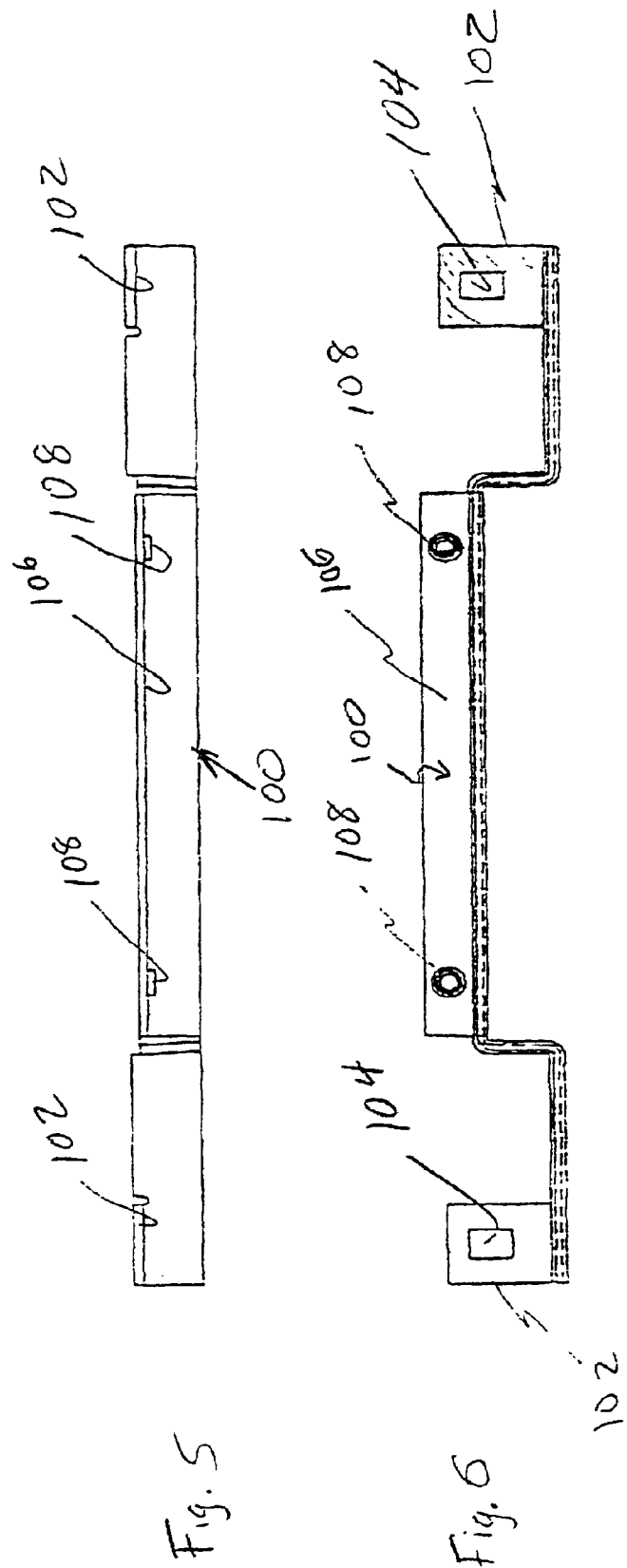

METHOD AND APPARATUS FOR PREVENTING DAMAGE DUE TO MEDIA FAULTS IN DISCS SPINNING AT HIGH SPEEDS

CROSS-REFERENCES TO RELATED APPLICATIONS

This invention derives priority from U.S. provisional patent application No. 60/213,735, titled "Method and Apparatus for Preventing Damage Due to Media Faults in Discs Spinning at High Speeds," filed Jun. 22, 2000, which is incorporated herein in its entirety for all purposes.

BACKGROUND OF THE INVENTION

Inferior quality optical media, such as CD-ROM discs or other discs, have been found to be susceptible to hairline cracks located toward the inner diameter. Under high rotation speeds, inferior media or media with hairline cracks can fracture after some time.

For example, referring to FIG. 1, a CD-ROM disc 1 will have hairline cracks 2 if used under wear-and-tear conditions for some time. Such hairline cracks may also often be found on those discs manufactured by an unlicensed manufacturer. Furthermore, referring to FIG. 2, the firmness of the locking feature 10 found on the cases 12 for CD-ROM discs prohibits convenient removal of the discs. When a user pulls a disc out of a case, the disc is forced against the locking feature. This causes the disc to bend and gives rise to hairline cracks 2 at the inner diameter 3 of the disc. Furthermore, these hairline cracks can continue to propagate as playing continues, eventually resulting in fracture of the disc.

Referring to FIG. 3, a drive 20 is shown with the tray 22 and tray cover (shutter) 24 in an open position. When a disc within the drive is spinning at high speeds (e.g., in excess of 8000 r.p.m.) and fractures, the front plastic enclosure 26 typically seen on drives is often insufficient to prevent disc fragments from flying out. This is because the front plastic enclosure simply is not as strong as the metal top enclosure 28. Consequently, these projectiles pose a considerable danger to the user and any people proximate the drive. Furthermore, the tray can be displaced outwardly from the assembly and the tray cover can become dislodged and cracked.

Attempts to lock the tray 22 in a closed position have proven to be inadequate because heavy impact forces can still open the tray. Furthermore, attempts to redesign the plastic tray cover 24 by creating thicker sections and strengthening features have failed because the tray can still be forced outwardly by high impact forces. Moreover, since sharp projectiles can penetrate the front plastic enclosure, the utilization of a stronger material has been employed. Nevertheless, it is possible that fragments can get caught between the front plastic enclosure and the metal top enclosure 28.

SUMMARY OF THE INVENTION

According to one aspect of the present invention, a system is provided that prevents fragments of a disc from escaping from a drive. The system comprises a drive and a fragment barricade affixed within the drive. The fragment barricade is positioned within the drive so as to prevent fragments of a disc from escaping from the drive.

According to another aspect of the invention, a fragment barricade is provided that comprises an elongate member, wherein the fragment barricade is positionable within a drive so as to prevent fragments of a disc from escaping from the drive.

According to another aspect of the invention, a method is provided of preventing fragments of a disc from escaping from a drive. The method comprises providing a drive and a fragment barricade. The fragment barricade is affixed within the drive. The fragment barricade is positioned within the drive so as to prevent fragments of a disc from escaping from the drive.

Other features and advantages of the invention will be apparent in view of the following detailed description and appended drawings.

BRIEF DESCRIPTION OF THE DRAWINGS

FIG. 5 is a bottom view of a fragment barricade of the present invention;

FIG. 6 is a side view of the fragment barricade of FIG. 5;

DETAILED DESCRIPTION OF THE PREFERRED EMBODIMENTS

Figure 1:
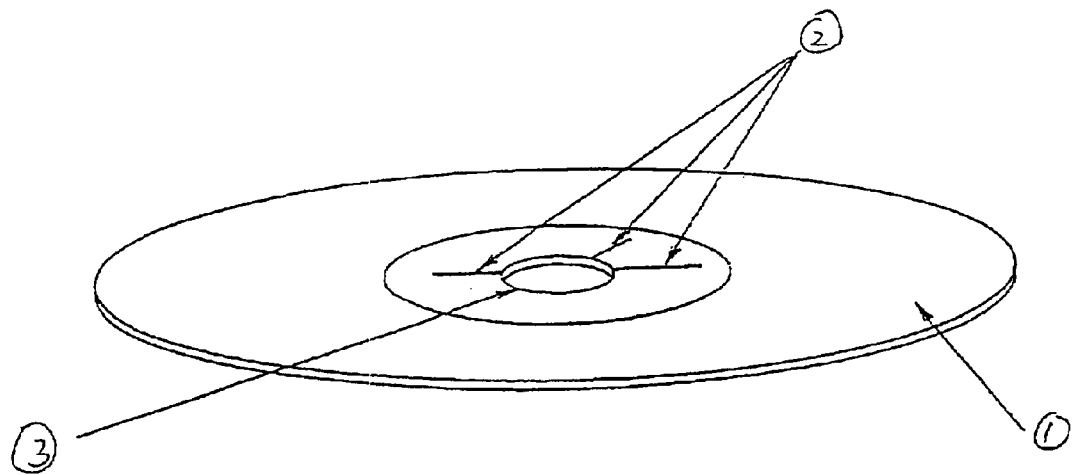
FIG. 1 is a perspective view of a disc.
Figure 2:
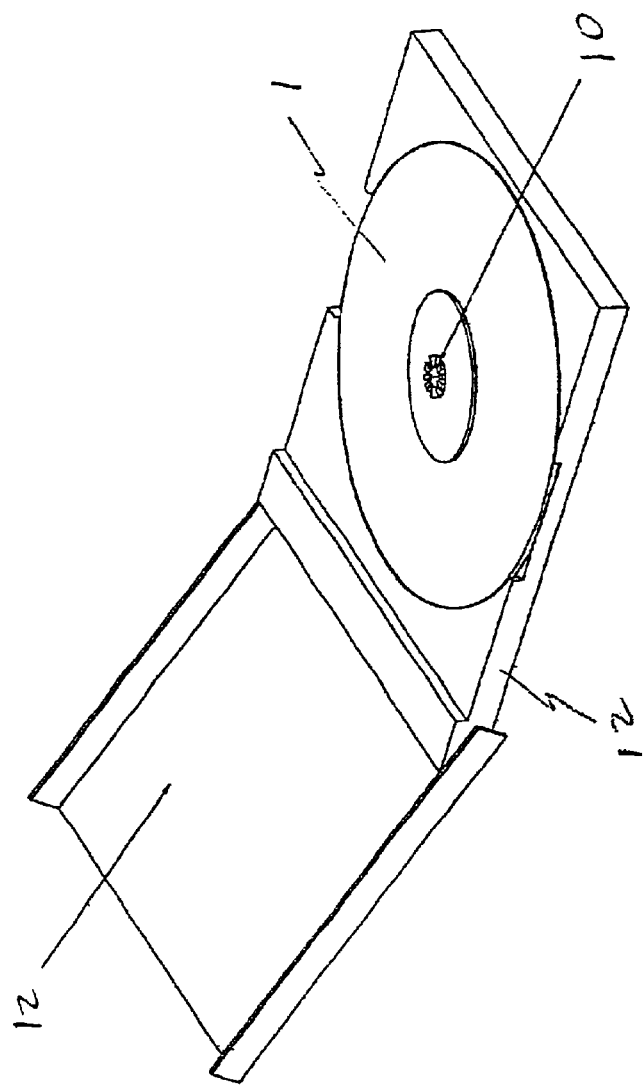
FIG. 2 is a perspective view of a disc case containing a disc.
Figure 3:
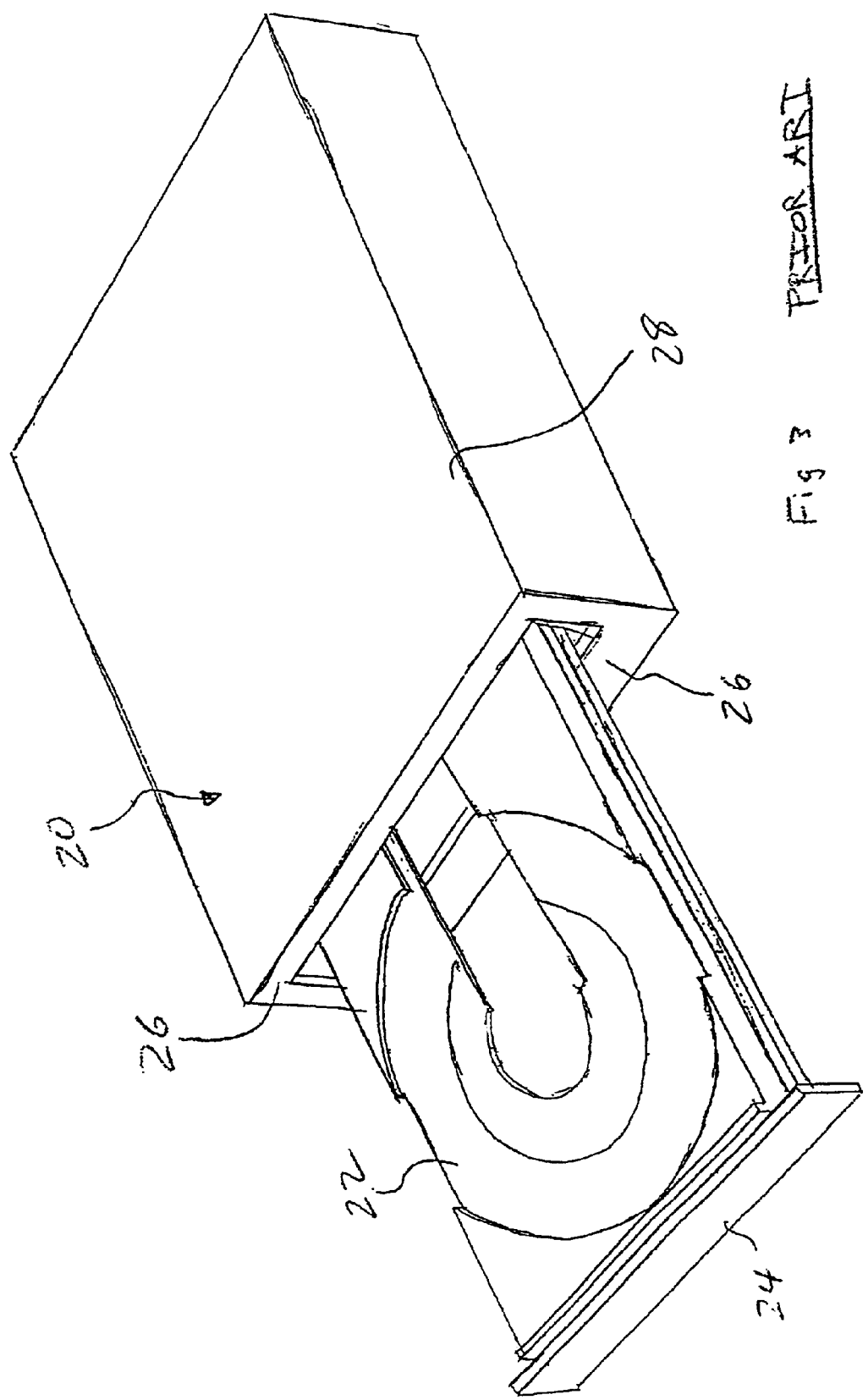
FIG. 3 is a perspective view of a drive.

As shown in the exemplary drawings wherein like reference numerals indicate like or corresponding elements among the figures, the present invention includes a system that prevents fragments of a disc from escaping from a drive. As mentioned previously, inferior quality optical media, such as CD-ROM discs or other discs, are often prone to hairline cracks located toward the inner diameter. The discs can fracture after some time under high rotation speeds. The front panel and shutter of an optical drive are not designed to protect from fractured flying media; rather, they are designed for decoration and completeness of the drive. Therefore, it would be desirable to find a way to prevent damage both to the disc drive and to the user.

Referring to FIGS. 4–8, a system is depicted that prevents fragments of a disc from escaping from a drive. The system includes a drive 20, which may be any suitable drive, including drives of the prior art.

Figure 4:
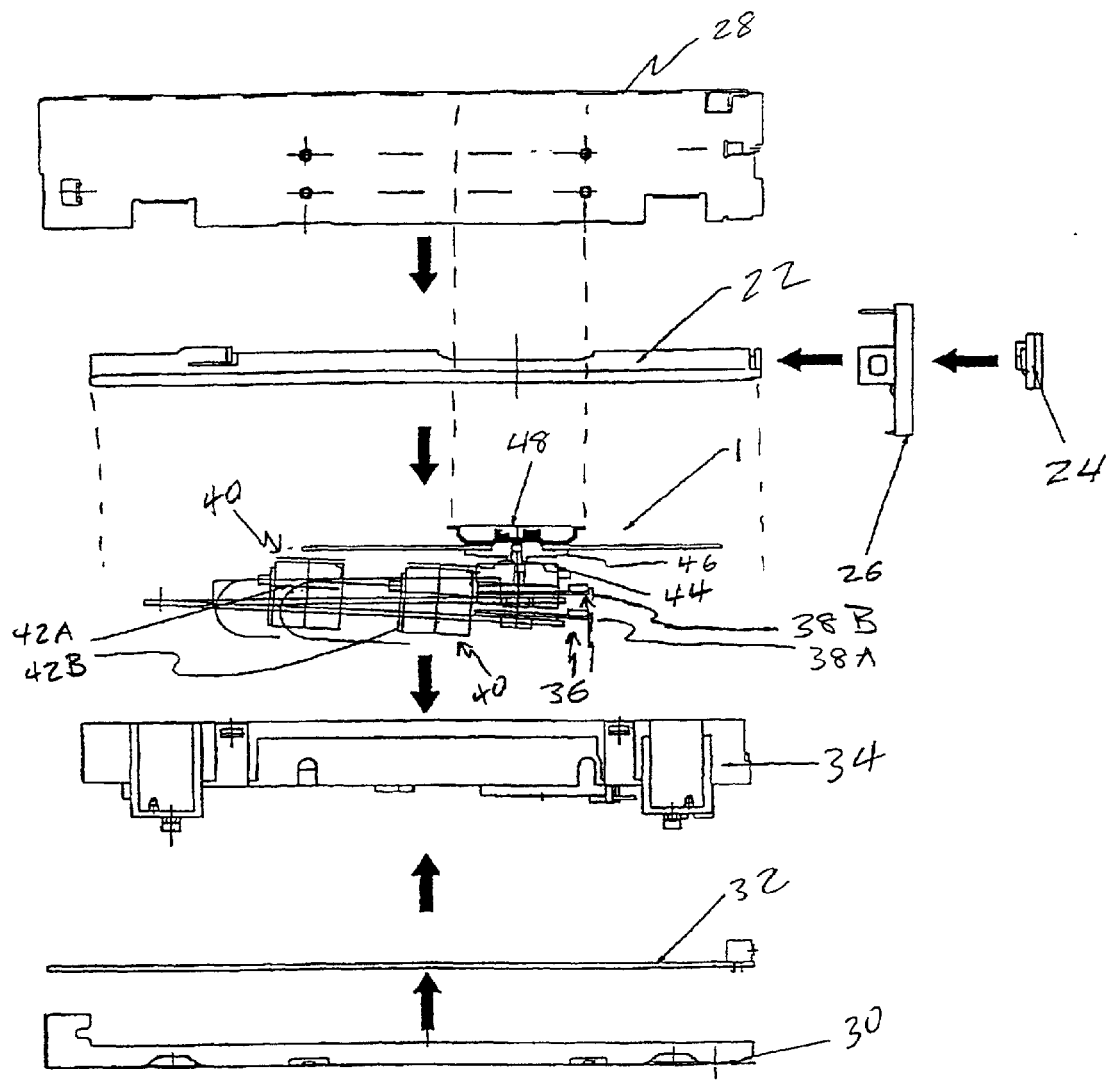
FIG. 4 is a side view of a drive of the present invention in unassembled relation.

Turning to FIG. 4, in one embodiment according to the present invention, the drive 20 includes a bottom enclosure 30. The bottom enclosure can be made of sheet metal or other suitable materials. A PC board 32 sits within the bottom enclosure. A chassis 34 is positioned on top of the PC board. The chassis can be formed from plastic or another suitable material.

An assembly 36 is affixed within the chassis 34. The assembly can move between a first position 38A and a second position 38B. A laser pick-up module 40 is slidably disposed within the chassis. The laser pick-up module can slide between a first position 42A and a second position 42B within the chassis.

A spindle motor 44 is rotatably mounted on the assembly 36. A spindle 46 is affixed to the spindle motor and rotates therewith. The spindle can come into apposition with a compact disc 1.

A tray 22 is attached to a tray cover (shutter) 24, both of which may be made of plastic or another suitable material.

The tray has an open position and a closed position and can slide in and out of the front plastic enclosure 26. A top enclosure 28, which can be made of metal or another suitable material, is attached to the bottom enclosure 30 and encases the internal elements of the drive.

A spinning disc 48, which can be made of plastic or another suitable material, is rotatably mounted within the top enclosure 28. The spinning disc 48 is shown as detached from the top enclosure in FIG. 4 to illustrate how the disc 1 is held between the spinning disc 48 and the spindle 46. Furthermore, the tray 22 is actually located below the disc 1 to support the disc 1; however, the tray is drawn above the disc 1 in FIG. 4 for clarity of illustration. The tray includes an opening therein in order that the spindle 46 and the laser pick-up module 40 can access the disc 1.

Figure 7:
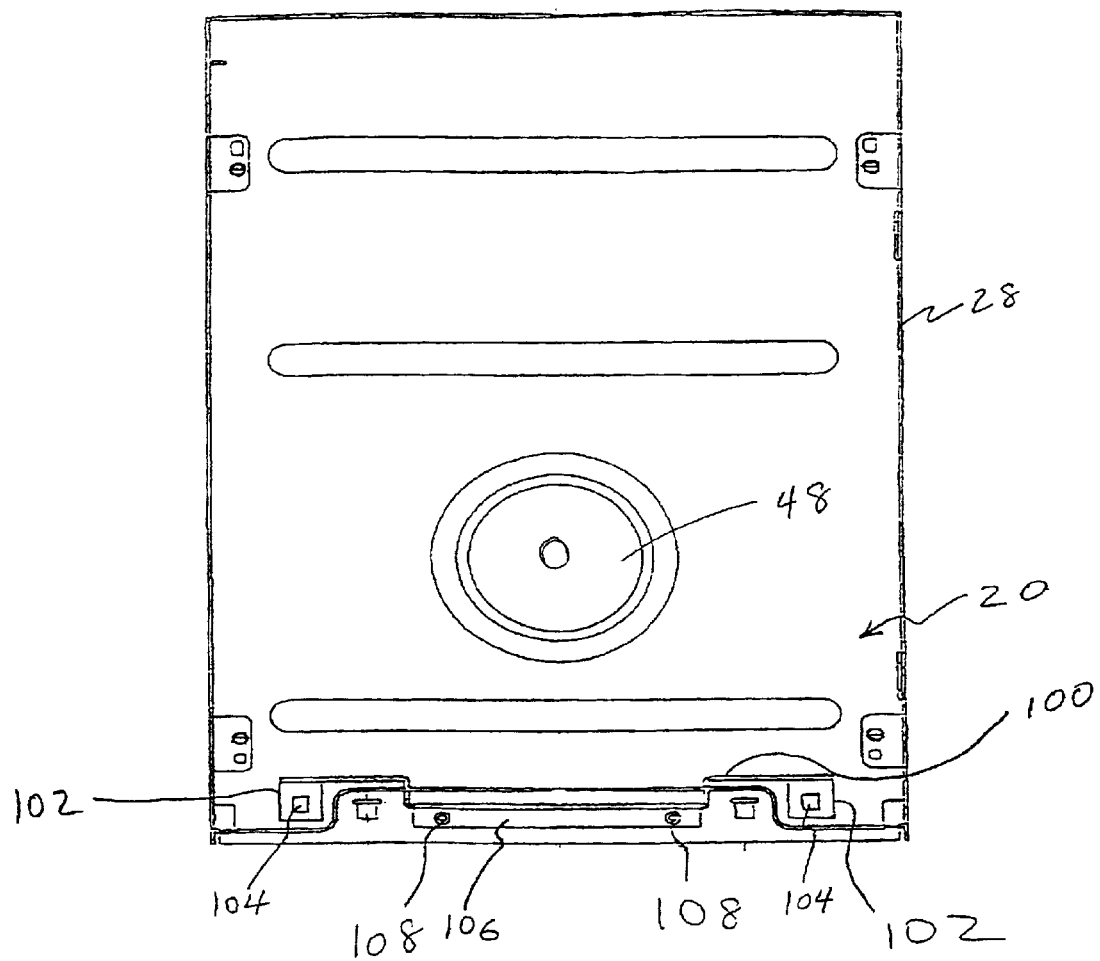
FIG. 7 is a diagram depicting the fragment barricade of FIG. 5 affixed within a drive.
Figure 8:
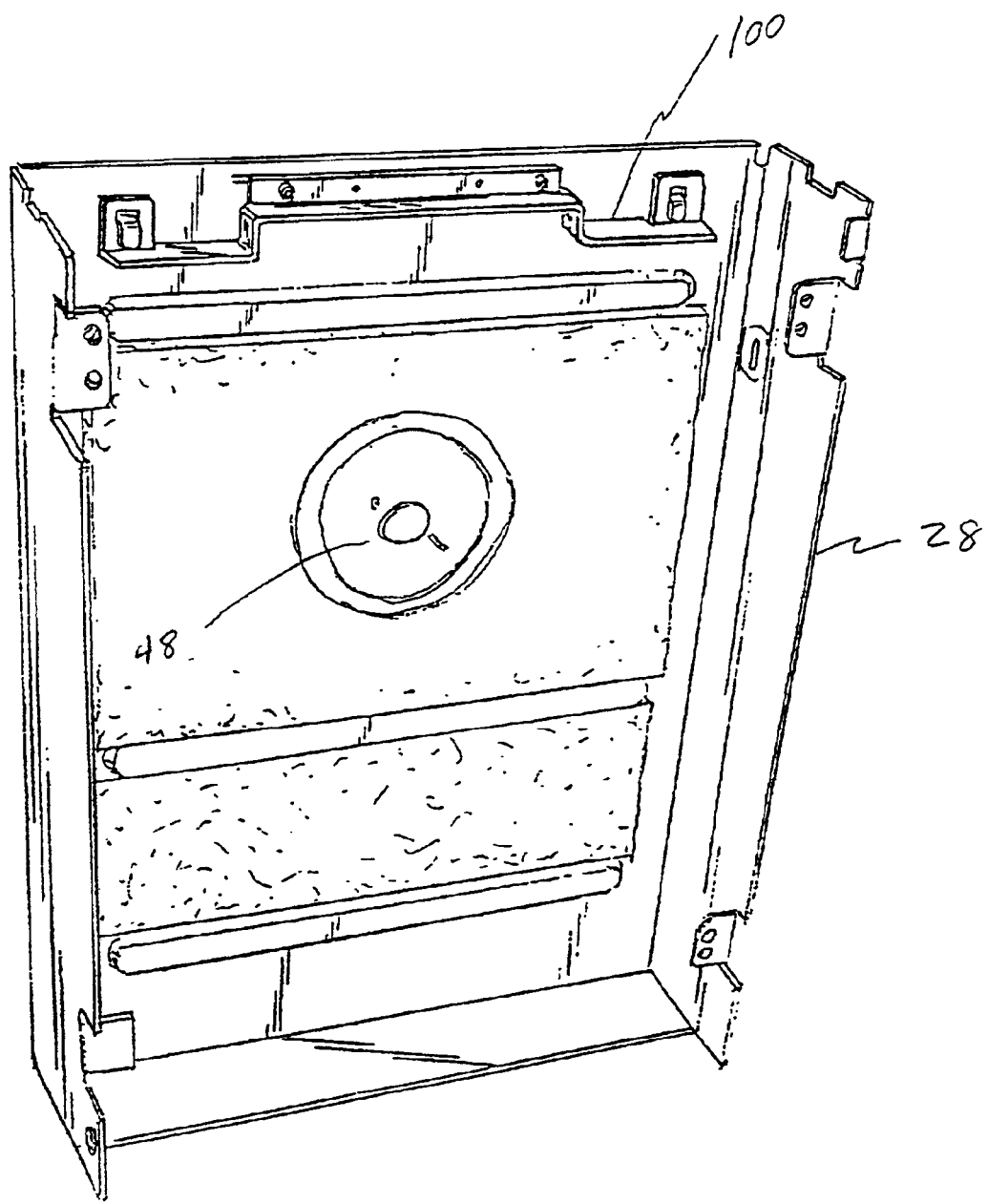
FIG. 8 is a perspective view of a portion of a drive with the fragment barricade of FIG. 5 affixed therein.

Referring now to FIGS. 5–8, in accordance with one embodiment of the present invention, a fragment barricade 100 is fixedly mounted within the top enclosure 28 of the drive 20. Only a the top enclosure of the drive is shown in FIGS. 7 and 8 for clarity of illustration. The fragment barricade can be formed from a hard material, such as a metal. The fragment barricade can also be formed from a flexible material. The fragment barricade can also be formed of materials such as a thick rubber sponge or a plastic material. It is contemplated that the fragment barricade can be made of any material or combination of materials sufficient to stop flying projectiles.

In keeping with the invention, the fragment barricade 100 is positioned within the drive 20 so as to prevent fragments of a disc from escaping from the drive. In one embodiment, the fragment barricade is an elongate member. However, it is envisioned that the fragment barricade may be of varying shapes.

In one embodiment, the fragment barricade 100 includes one or more side latches, or attachment elements 102. The attachment elements can include apertures 104 to facilitate attachment of the fragment barricade to the drive 20, such as by metal flanges or other elements. The attachment elements further provide added strength and resiliency to the fragment barricade.

The fragment barricade 100 further includes a plate 106 having apertures 108. The apertures 108 can receive self-tapping screws, or other elements, therethrough to facilitate attachment of the fragment barricade to the drive 20.

The fragment barricade 100 can be manufactured using conventional methods. For example, the fragment barricade can be stamped out from a metal sheet and formed into shape by a tool or machine. In one embodiment, the fragment barricade can be mounted within the drive 20 on the front underside of the top enclosure proximate where a disc rotates. However, it is envisioned that the fragment barricade can be mounted elsewhere as well.

In operation, a disc 1 is placed within the tray 22 while the tray is in an open position. The tray is then closed by way of a switch or other actuating mechanism. The assembly 36 then moves into its second position 38B. This action causes the spindle 46 to come into apposition with the disc 1 by way of an opening in the tray. Thus, the spindle lifts the disc 1 and clamps the disc 1 against the spinning disc 48. The spindle motor 44 rotates the spindle 46, which in turn rotates the disc 1. The spinning disc 48 thus rotates with the disc 1. The laser pick-up module 40 slides back and forth with respect to the assembly while the disc 1 is spinning, and is thus able to access and read any portion of the disc 1.

As described supra, the disc 1 may fracture over time. If it were not for the fragment barricade 100, fragments of the disc 1 could strike against the inside of the plastic front enclosure 26 at a high velocity and either pierce the front enclosure or open the tray 22 and shutter 24. This could damage the drive 20 and people in the vicinity of the drive. The fragment barricade of the present invention serves to stop any fragments of the disc 1 from doing damage to the drive or others. Furthermore, the fragment barricade is inexpensive and easy to manufacture, and can be mounted within other types of media players.

The invention has now been described with reference to the preferred embodiments. Alternatives and substitutions will now be apparent to persons of skill in the art. For example, the fragment barricade can be used with various other types of drives, such as drives that utilize media other than CD-ROM discs 1 or drives that do not have trays 22. Accordingly, it is not intended to limit the invention except as provided by the appended claims.

What is claimed is:

1. A system that prevents fragments of a disc from escaping from a drive, the system comprising:

a drive including an opening in a front side of the drive through which a tray for receiving a disc is displaceable;

a cover to cover the opening when the tray is within the drive; and a fragment barricade affixed within the drive, the fragment barricade being in addition to the cover, wherein the fragment barricade is positioned within the drive so as to prevent fragments of a disc from escaping from the front side of the drive including the opening and the cover.

2. The system of claim 1 wherein the fragment barricade is fixedly mounted within the drive, the fragment barrier being rectangular in shape and positioned between the disc and a closure member to the opening.

3. The system of claim 1 wherein the drive includes a top enclosure and the fragment barricade is rectangular in plan and mounted within the top enclosure.

4. The system of claim 1 wherein the drive is an optical drive.

5. The system of claim 1 wherein the fragment barricade is formed from a metal.

6. The system of claim 1 wherein the fragment barricade is formed from a hard material.

7. The system of claim 1 wherein the fragment barricade is formed from a flexible material.

8. The system of claim 1 wherein the fragment barricade includes a rectangular member operatively positioned along the front side of the drive proximate the opening.

9. The system of claim 1 wherein the fragment barricade includes an attachment element.

10. A method of preventing fragments of a disc from escaping from a drive, the method comprising:

providing a drive including an opening in a front side of the drive through which a tray for receiving a disc is displaceable;

providing a cover to cover the opening when the tray is within the drive;

providing a fragment barricade in addition to the cover; and affixing the fragment barricade within the drive, wherein the fragment barricade is positioned within the drive so as to prevent fragments of a disc from escaping from the front side of the drive including the opening and the cover.

11. A system that prevents fragments of a disc from escaping from a drive, the system comprising:
- a drive housing including an opening through which a tray for receiving a disc is displaceable; a cover to cover the opening when the tray is within the drive housing;
- a fragment barricade affixed within the drive housing, the fragment barricade being in addition to the cover,
- wherein the fragment barricade is positioned within the drive housing proximate the opening so as to prevent fragments of a disc from escaping from the opening to the drive housing and the cover.

12. The system of claim 11 wherein the fragment barricade is fixedly mounted within the drive housing and positioned between the disc and a closure member to the opening.

13. The system of claim 11 wherein the opening is provided in a front side of the housing and the fragment barricade extends beyond a periphery of the opening to prevent fragments from escaping the front side of the housing.

* * * * *